United States Patent

Walton et al.

[11] Patent Number: 5,999,242
[45] Date of Patent: Dec. 7, 1999

[54] ADDRESSABLE MATRIX ARRAY CONTAINING ELECTRODES WITH A VARIETY OF RESISTANCES FOR FERROELECTRIC LIQUID CRYSTAL DEVICE

[75] Inventors: Harry Garth Walton; Michael John Towler, both of Oxford, United Kingdom

[73] Assignees: Sharp Kabushiki Kaisha, Osaka, Japan; The Secretary of State for Defence in Her Britannic Majesty' Government of the United Kingdom of Great Britain and Northern Ireland, Hants, United Kingdom

[21] Appl. No.: 08/851,616

[22] Filed: May 6, 1997

[30] Foreign Application Priority Data

May 17, 1996 [GB] United Kingdom .................... 9610322

[51] Int. Cl.[6] ....................... G02F 1/1343; G02F 1/1333; G02F 1/141; G02G 3/36
[52] U.S. Cl. .......................... 349/148; 349/143; 349/161; 349/37; 345/97
[58] Field of Search ............................... 349/37, 72, 143, 349/148, 161; 345/97, 100

[56] References Cited

U.S. PATENT DOCUMENTS

| | | | |
|---|---|---|---|
| 4,281,324 | 7/1981 | Nonmura et al. | 345/103 |
| 4,390,244 | 6/1983 | Hareng et al. | 349/158 |
| 4,655,561 | 4/1987 | Kanbe et al. | 345/97 |
| 4,688,896 | 8/1987 | Castleberry | 345/103 |
| 4,807,973 | 2/1989 | Kawasaki | 349/139 |
| 4,824,218 | 4/1989 | Kuno et al. | 345/97 |
| 5,543,946 | 8/1996 | Enomoto et al. | 349/139 |
| 5,671,032 | 9/1997 | Lee | 349/122 |
| 5,825,344 | 10/1998 | Hughes et al. | 345/94 |

FOREIGN PATENT DOCUMENTS

| | | | |
|---|---|---|---|
| 60230632 | 11/1985 | Japan | 349/139 |
| 61-59425A | 3/1986 | Japan | 349/148 |
| 63032524 | 2/1988 | Japan | 349/139 |
| 02067521 | 3/1990 | Japan | 349/139 |
| 267521 | 3/1990 | Japan | 349/139 |
| 3-189622A | 8/1991 | Japan | 349/148 |
| 04269789 | 9/1992 | Japan | 349/139 |
| 5-203997A | 8/1993 | Japan | 349/148 |

OTHER PUBLICATIONS

P.W.H. Surguy et al., Feroelectrics, 1991, vol. 122, pp. 63–79, "The 'Joers/Alvey' Ferroelectric Multiplexing Scheme".

European Search Report mailed Sep. 2, 1997 for EPO Application No. 97303370.7.

Primary Examiner—William L. Sikes
Assistant Examiner—Kari M. Horney

[57] ABSTRACT

An addressable matrix display comprises an addressable matrix of pixels, a first set of electrode tracks on one side of the matrix and a second set of electrode tracks on the other side of the matrix. The sets of electrode tracks cross one another at the locations of the pixels, and the pixels are switchable by the application of respective switching waveforms to the electrode tracks. Furthermore at least one of the electrode tracks has a resistance which varies along the length of the electrode track in order to provide increased temperature uniformity over the display due to power dissipation during switching by the switching waveforms applied to the electrode tracks. More particularly the resistance in an intermediate section of the electrode track is greater than the resistance in two end sections of the electrode track.

9 Claims, 4 Drawing Sheets

ADDRESSABLE MATRIX ARRAY CONTAINING ELECTRODES WITH A VARIETY OF RESISTANCES FOR FERROELECTRIC LIQUID CRYSTAL DEVICE

FIELD OF THE INVENTION

This invention relates to addressable matrix arrays, and concerned more particularly, but not exclusively, with ferroelectric liquid crystal devices.

BACKGROUND OF THE INVENTION

Liquid crystal devices incorporating a ferroelectric smectic liquid crystal material (FLCDs) are particularly suitable for use in displays and shutters in which their fast switching times and memory characteristics are of advantage. A conventional FLCD cell comprises a layer of ferroelectric smectic liquid crystal material between two parallel glass substrates, electrode structures being typically provided on the inside facing surfaces of the glass substrates in the form of row and column electrode tracks which cross one another to form a matrix array. As is well known, switching pulses are applied to the row and column electrode tracks in order to produce electric fields which switch the molecules within the material between two polar states having different molecular orientations. In a display device in which the cell is disposed between two polarisers having polarising axes which are substantially perpendicular to one another, a display element or pixel at the intersection of two electrode tracks may appear dark or light depending on the state to which the molecules of the pixel have previously been switched, as a result of the different light transmitting properties of the two molecular orientations.

Various addressing schemes for controlling such a matrix array FLCD are known, and reference may be made in this regard to Surguy, Ayliffe, Birch, Bone, Coulson, Crossland, Hughes, Ross, Saunders and Towler, "The Joers/Alvey Ferroelectric Multiplexing Scheme", *Ferroelectrics,* 1991, Vol. 122, pp. 63–79 which refers to a number of such addressing schemes. Typically, in large display panels, the display panel is addressed on a line-by-line basis by applying data pulses in parallel to the column electrode tracks, each data pulse being either a switching pulse or a non-switching pulse, and by sequentially applying a strobe pulse to the row electrode tracks so as to switch selected pixels along each row from one state to the other under the effect of the electric field produced by the voltage difference between the data pulse and the strobe pulse applied to the relevant electrode tracks. In certain addressing schemes a blanking pulse is applied sequentially to the row electrode tracks which is of such a voltage and duration as to set all the pixels along each row to one state, irrespective of the data pulses applied to the column electrode tracks. Subsequent application of strobe and data pulses may then be used to switch selected pixels to the other state whilst leaving the remaining pixels in the one state.

Furthermore, in large display panels, in which the addressing of the display panel leads to the application of high frequency alternating voltages to the row and column electrode tracks, the power loss, due to repeated charging and discharging of the liquid crystal capacitance through the electrode tracks, can lead to a large heating effect. Since the image quality and addressing properties of such displays are highly sensitive to temperature, such heating can lead to changes in the display performance. If the temperature increases uniformly over a display panel as a result of this heating effect, then the addressing parameters can be modified, for example by modifying the switching waveforms in dependence on the sensed temperature of the panel, in order to ensure satisfactory display performance. However, if there is a non-uniform temperature variation over the display panel as a result of the heating effect, it becomes difficult to compensate for such temperature variation by modification of the addressing parameters. Such temperature variations over a display panel can lead to variations in contrast ratio, greyscale, operating window, viewing angle and other display properties, and as a result can render it impossible to obtain uniform display performance over a large display panel.

Japanese Patent Publication No. 2-67521A discloses a ferroelectric liquid crystal display in which the resistance of the electrodes increases further from the driving source, for example by making each electrode progressively smaller in cross-section, in order to attempt to provide a uniform temperature distribution within the display.

SUMMARY OF THE INVENTION

It is an object of the invention to provide an improved addressable matrix array in which the extent of temperature variations over a display panel is controlled.

According to the present invention there is provided an addressable matrix array comprising an addressable matrix of switching elements, a first set of electrode tracks on one side of the matrix, and a second set of electrode tracks on the other side of the matrix, the first and second sets of electrode tracks crossing one another at the locations of the switching elements and the switching elements being switchable by the application of respective switching waveforms to the first and second sets of electrode tracks, and at least one of the electrode tracks having a resistance which varies along the length of the electrode track in order to provide increased temperature uniformity over the array due to power dissipation during switching by the switching waveforms applied to the electrode tracks, characterised in that the resistance in an intermediate section of said at least one electrode track is greater than the resistance in two end sections of the electrode track.

Such variation in the resistance of the electrode tracks can be used to produce spatially uniform power dissipation in the array with the result that the temperature, and hence the display performance in the case of a display, can be rendered more uniform over the array.

In one embodiment the resistance of said at least one electrode track varies along the length of the electrode track by virtue of the fact that at least one section of the electrode track has a greater transverse width than at least one other section of the electrode track.

In another embodiment the resistance of said at least one electrode track varies along the length of the electrode track by virtue of the fact that at least one section of the electrode track has a greater metallization thickness than at least one other section of the electrode track.

Preferably at least parts of the electrode tracks are made of transparent material. Most preferably said at least one electrode track comprises a main track portion of transparent material and a supplementary track portion of non-transparent material and of a greater conductivity which runs alongside, and is in electrical contract with, the main track portion.

In one embodiment the resistance of said at least one electrode track varies along the lengths of the electrode track by virtue of the fact that the main track portion and/or the supplementary track portion of at least one section of the electrode track has a greater transverse width than the corresponding portion of at least one other section of the electrode track.

In another embodiment the resistance of said at least one electrode track varies along the length of the electrode track by virtue of the fact that the main track portion and/or the supplementary track portion of at least one section of the electrode track has a greater metallization thickness than the corresponding portion of at least one other section of the electrode track.

The invention also provides an addressable matrix array comprising an addressable matrix of switching elements, a first set of electrode tracks on one side of the matrix, and a second set of electrode tracks on the other side of the matrix, the first and second sets of electrode tracks crossing one another at the locations of the switching elements and the switching elements being addressable by the application of respective switching waveforms to the first and second sets of electrode tracks, and at least one of the sets of electrode tracks incorporating a temperature balancing arrangement for balancing the differential effects of power dissipation due to switching over different parts of the array, characterised in that the temperature balancing arrangement comprises a first subset of electrode tracks having end connection points at one edge of the array for connection to drive circuitry for applying respective switching waveforms to the electrode tracks of the first subset by way of said end connection points, and a second subset of electrode tracks interleaved with the electrode tracks of the first subset and having end connection points at the opposite edge of the array for connection to drive circuitry for applying respective switching waveforms to the electrode tracks of the second subset by way of said end connection points.

The matrix array may be a liquid crystal display, a plasma display, an electroluminescent display, or any other form of matrix device incorporating a matrix of pixels addressable by means of first and second sets of electrode tracks. The precise functional form of the resistance variation needed to ensure substantially uniform power dissipation will depend on the addressing waveforms and the electrode pattern.

For a fuller understanding of the nature and advantages of the invention, reference should be made to the ensuing detailed description taken in conjunction with the accompanying drawings.

DESCRIPTION OF THE PREFERRED EMBODIMENTS

Figure 1:
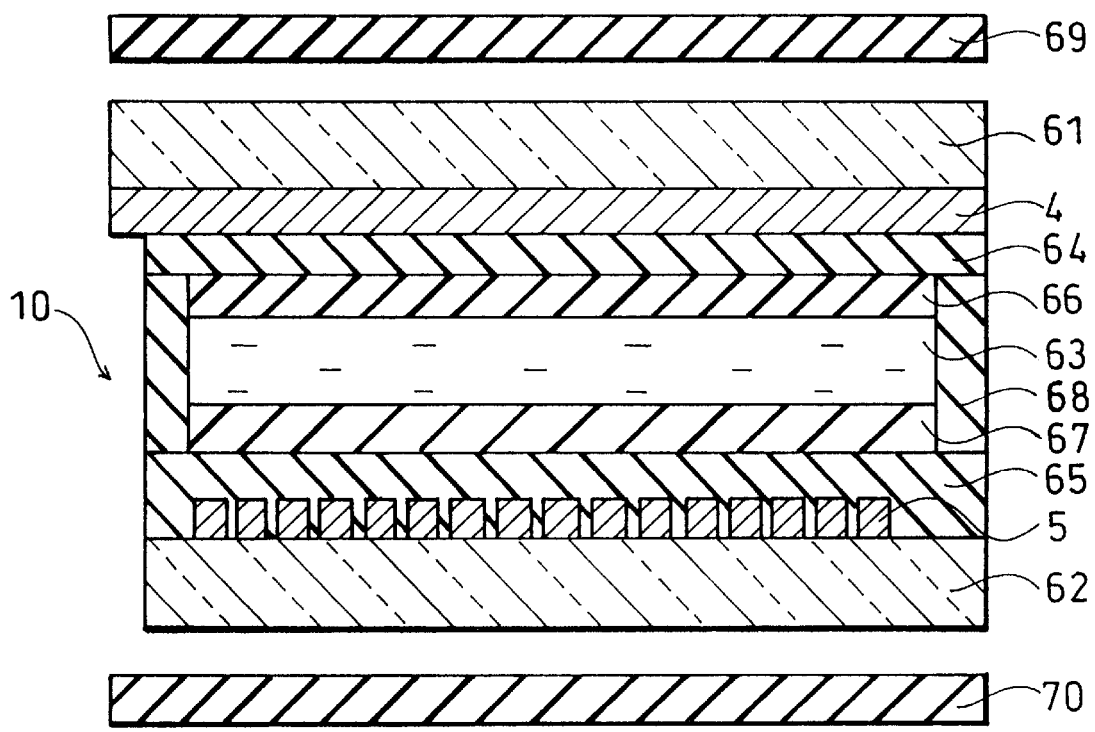
FIG. 1 is a diagrammatic section through a ferroelectric liquid crystal display panel.

The following description will be given with reference to a large ferroelectric liquid crystal display (FLCD) panel 10 shown diagrammatically in FIG. 1. The FLCD panel 10 comprises a layer 63 of ferroelectric smectic liquid crystal material contained between two parallel glass substrates 61 and 62 bearing first and second electrode structures on their inside surfaces. The first and second electrode structures comprise respectively a series of row and column electrode tracks 4 and 5 which cross one another to form a matrix array. Furthermore alignment layers 66 and 67 are provided on insulating layers 64 and 65 applied on top of the row and column electrode tracks 4 and 5, so that alignment layers 66 and 67 contact opposite sides of the ferroelectric liquid crystal layer 63 which is sealed at its edges by a sealing member 68. The panel 10 is disposed between polarisers 69 and 70 having polarising axes which are substantially perpendicular to one another. However it will be understood that such a FLCD constitutes only one type of addressable matrix array to which the invention is applicable, and the following description of such a display is therefore to be considered as being given only by way of non-limiting example.

Figure 2:
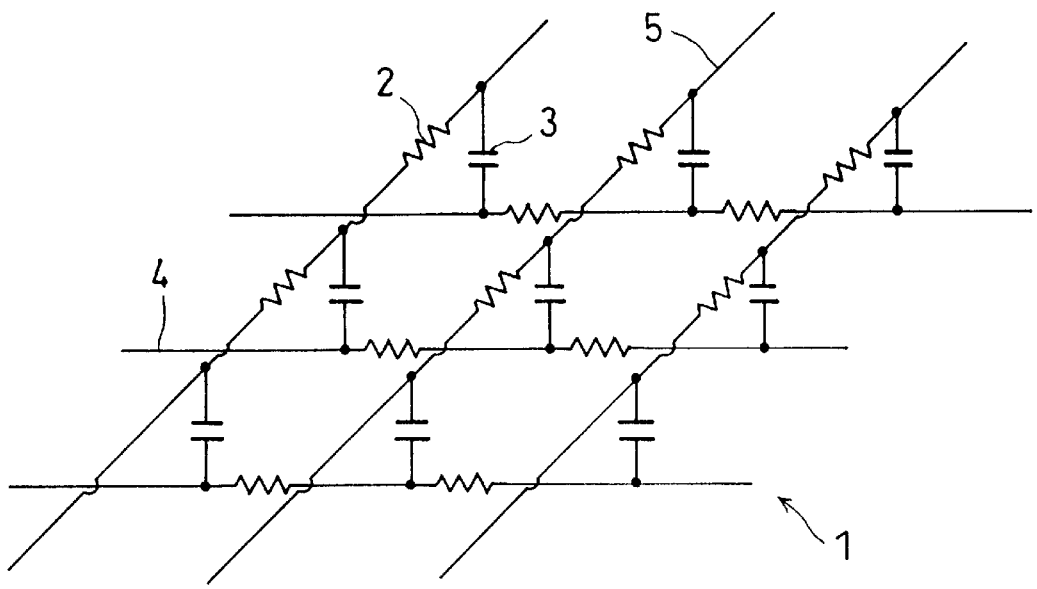
FIG. 2 is a theoretical model showing a matrix array as a network of resistors and capacitors.
Figure 3:
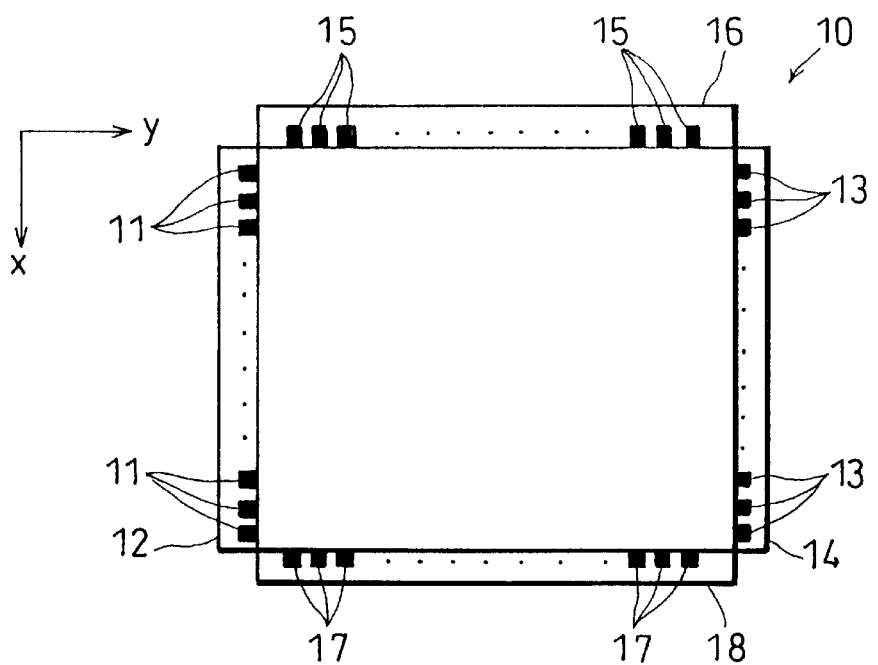
FIG. 3 is a schematic diagram of a liquid crystal panel having alternate column and row electrode tracks driven from opposite end.

The FLCD panel can notionally be considered as comprising a network 1 of resistors 2 and capacitors 3, as shown in FIG. 2, the resistors 2 representing the resistance of sections of the row and column electrode tracks 4 and 5 provided on either side of the ferroelectric liquid crystal layer and connected to suitable a.c. drive circuitry, and the capacitors 3 representing liquid crystal capacitances of the display pixels at the intersections of the electrode tracks 4 and 5. It will be understood that FIG. 2 shows only a small portion of the network 1 and that, in practice, the FLCD panel will incorporate a large number of pixels, for example 1024×768, particularly where multiple tracks are required for greyscale addressing by spatial dither or for colour display.

Where connections from the row driver circuitry are made to all the row electrode tracks along one edge of the display or connections from the column driver circuitry are made to all the column electrode tracks along a further edge of the display, the heating effect will tend to be greater at locations along the electrode tracks which are closer to the connection points since the power dissipation at such a location will be caused by charging and discharging of the liquid crystal capacitances along the whole of that part of the electrode track which extends from the location away from the connection point, with the result that the panel temperature will tend to be greater over some parts of the panel than over other parts of the panel in operation. Accordingly, as shown in FIG. 3, which diagrammatically shows one face of the FLCD panel 10, the connections from the row driver circuitry to the panel 10 are made to connection points 11 of a first subset of row electrode tracks at one edge 12 of the panel 10, and to connection points 13 of a second subset of row electrode tracks at the opposite edge 14 of the panel 10, such that the row electrode tracks of the first subset alternate with the row electrode tracks of the second subset over the panel 10. Furthermore the connections from the column driver circuitry to the panel 10 are made to connection points 15 of a first subset of column electrode tracks at a third edge 16 of the panel 10, and to connection points 17 of a second subset of column electrode tracks at the fourth edge 18 of the panel 10, such that the column electrode tracks of the first subset alternate with the column electrode tracks of the second subset over the panel 10. Such alternate addressing of the row electrode tracks and of the column electrode tracks will have the effect of ensuring that the heating effect operates more uniformly over the panel, although there will still be a tendency for greater panel heating to occur in regions closer to the edges of the panel than in regions towards the middle of the panel.

Figure 4:
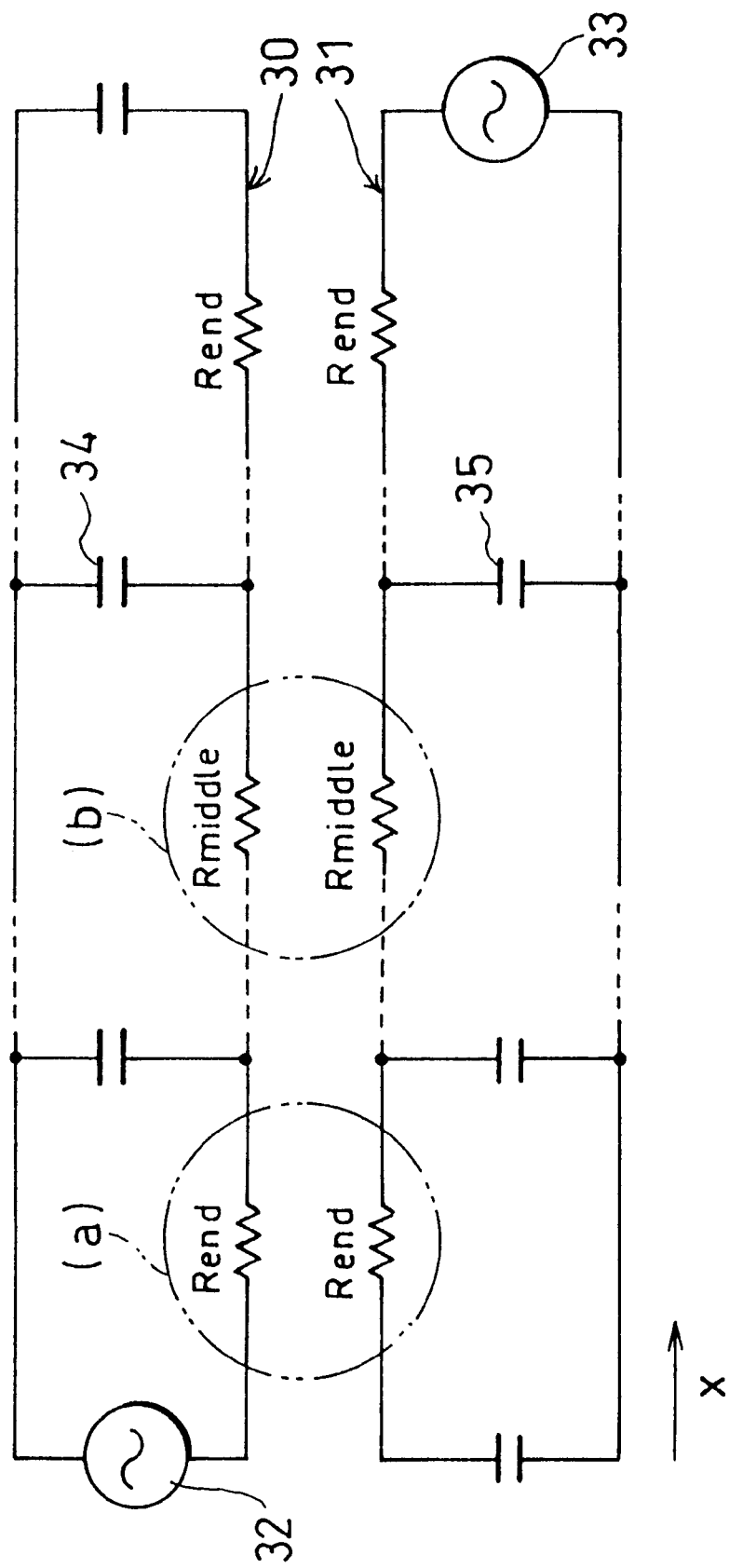
FIG. 4 is a schematic diagram showing two adjacent column electrode tracks of a matrix array modelled as simple transmission lines.

FIG. 4 shows two adjacent column electrode tracks of the panel 10 of FIG. 3 modelled as simple transmission lines 30 and 31 and driven by alternating data waveforms applied to opposite ends of the electrode tracks by the column driver circuitry, as indicated by a.c. generators 32 and 33. The display pixels are modelled as capacitors 34 and 35 in the transmission lines 30 and 31, and the resistance of the electrode tracks is indicated by distributed resistors $R_{end}$ and $R_{middle}$, where $R_{end}$ are the resistances of the track sections between adjacent pixels in the vicinity of the two ends of the electrode tracks and $R_{middle}$ are the resistances of the track sections between adjacent pixels in the middle of the electrode tracks.

Assuming the capacitance per unit length of each transmission line 30, 31 is constant and that there is a small voltage drop along the transmission lines, the total power dissipated due to Joule heating by the combination of resistances at one end of the transmission lines, as circled at (a) in FIG. 4, is approximately $(m^2+1)I^2R_{end}$, where I is the current required to charge/discharge one capacitor (pixel) at the drive frequency and m is the number of capacitances/resistances in each transmission line. Furthermore the total power dissipated by the combination of resistances in the middle of the transmission lines, as circled at (b) in FIG. 4, is about $0.5\,m^2I^2R_{middle}$. Accordingly, in order to ensure that the power dissipated in the middle of the transmission lines is similar to that dissipated at the ends of the transmission lines, it will be sufficient to a first approximation to set $R_{middle}=2R_{end}$. Such variation in resistance between the middle and ends of each electrode track may be provided by ensuring that each electrode track is thinner in an intermediate middle section of the track than in two end sections of the track, so that it has greater resistivity in the middle section than at the end sections.

A more nearly uniform power dissipation over the whole panel area can be obtained by extending the resistance variation over the length of each electrode track using, for example, an expression for the resistance R(x) of a unit length of electrode track at a distance x along the electrode track of $R(x)=R_{end}(1-2x+2x^2)^{-1}$. More generally the resistance $R_{column}(x)$ of a unit length of column electrode track at a distance x along the electrode track and the resistance $R_{row}(y)$ of a unit length of row electrode track at a distance y along the electrode track can be set to be given by the expressions $R_{column}(x)=R_{end}(1-2x+2x^2)^{-1}$ and $R_{row}(y)=R_{end}(1-2y+2y^2)^{-1}$.

The track resistance may be varied on either or both of the row electrode tracks and column electrode tracks of the panel in order to provide approximately uniform power dissipation, and to thereby ensure as far as possible that the heating effect acts substantially uniformly over the panel so that, if required, known measures can be used to offset the effect on display performance of any temperature variation with time. The precise function or form of the resistance variation along each row and/or column electrode track needed to ensure approximately uniform power dissipation over the panel will depend on the addressing waveform and the form of the electrode pattern, including the density and thickness of the electrode tracks.

Figure 5:
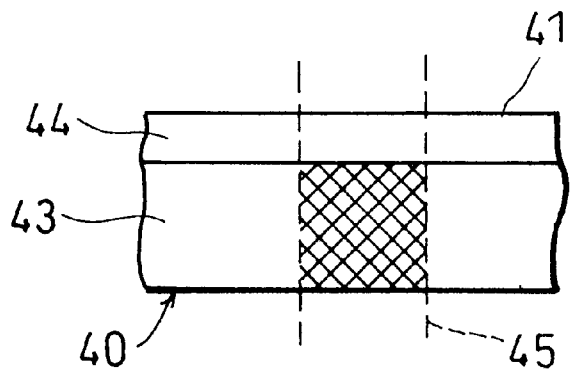
FIGS. 5, 6, 7 and 8 are explanatory diagrams showing possible arrangements for varying the resistivity along an electrode track.
Figure 6:
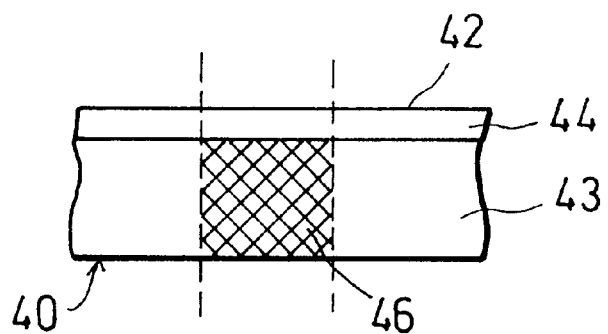

By way of example, FIGS. 5 and 6 show sections 41 and 42 of a row electrode track 40 in end and middle regions of the track respectively. The electrode track 40 typically comprises a main, relatively narrow transparent portion 43 of indium tin oxide (ITO) and a supplementary, relatively narrow non-transparent portion 44 of a high conductivity metal, such as aluminium, chromium or molybdenum, which runs alongside the portion 43 and is in electrical contact therewith so as to increase the conductivity of the track as a whole. The portion 43 crosses the corresponding portion 45 of a column electrode track so as to define a pixel 46 therewith. As is well known, the supplementary portion 44 constitutes a low resistance metallisation strip which serves to improve the conductivity to the drive waveforms (as the ITO portion 43 is of relatively low conductivity) whilst being sufficiently narrow to avoid compromising the light transmitting properties of the panel. A comparison of FIGS. 5 and 6 shows that the supplementary portion 44 is of lesser width, and therefore of greater resistance, in the middle section 42 of FIG. 6 than in the end section 41 of FIG. 5, whereas the main portion 43 is of the same width in both sections, so that the size of the pixel is the same in both sections. However it is also possible for the main portion 43 to be of different widths in the two sections 41 and 42, or for both portions 43 and 44 to be of different widths in the two sections 41 and 42 under certain circumstances.

Figure 7:
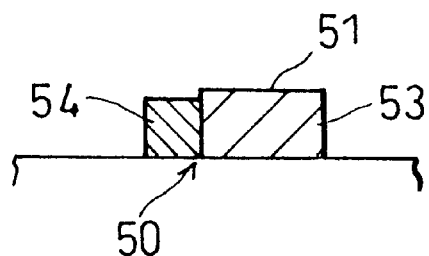
Figure 8:
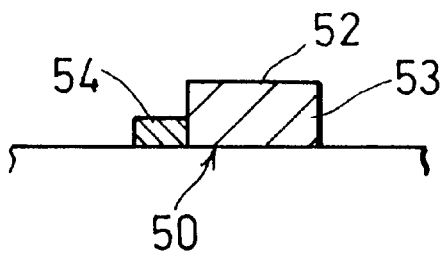

In a further example the end and middle sections 51 and 52 of an electrode track 50 shown in FIGS. 7 and 8 comprise a main ITO portion 53 and a supplementary low resistance metallisation portion 54. In this case the supplementary portion 54 is of lesser thickness, and therefore of greater resistance, in the middle section 52 of FIG. 8 than in the end section 51 of FIG. 7, whereas the main portion 53 is of the same thickness in both sections. However it is also possible for the main portion 53 to be of lesser thickness in the middle section 52 than in the end section 51, or for both portions 53 and 54 to be of lesser thickness in the middle section 52 than in the end section 51. Furthermore such variation in the metallisation thickness of the portion 53 and/or the portion 54 may also be combined with variation of the width of these portions as described with reference to FIGS. 5 and 6.

By introducing compensating non-uniformities in panel construction, the above described arrangements enable reductions in the non-uniformity of power dissipation, and in corresponding temperature variation, over the panel. By removing large temperature variations over the panel, a spatially uniform display performance may be achieved allowing relatively uniform contrast ratio, greyscale, operating window, viewing angle, etc. in operation of the panel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An addressable matrix array comprising an addressable matrix of switching elements, a first set of electrode tracks on one side of the matrix, and a second set of electrode tracks on the other side of the matrix, the first and second sets of electrode tracks crossing one another at the locations of the switching elements and the switching elements being switchable by the application of respective switching waveforms to the first and second sets of electrode tracks, and at least one of the electrode tracks having a resistance which varies along the length of the electrode track in order to provide increased temperature uniformity over the array due to power dissipation during switching by the switching waveforms applied to the electrode tracks, wherein the resistance in an intermediate section of said at least one electrode track is greater than the resistance in two end sections of the electrode track, the two end sections being located operatively among the switching elements.

2. An array according to claim 1, wherein the resistance of said at least one electrode track varies along the length of the electrode track by virtue of the fact that at least one section of the electrode track has a greater transverse width than at least one other section of the electrode track.

3. An array according to claim 1, wherein the resistance of said at least one electrode track varies along the length of the electrode track by virtue of the fact that at least one section of the electrode track has a greater metallization thickness than at least one other section of the electrode track.

4. An array according to claim 1, which is a matrix display, wherein at least parts of the electrode tracks are made of transparent material.

5. An array according to claim 4, wherein said at least one electrode track comprises a main track portion of transparent material and a supplementary track portion of non-transparent material and of a greater conductivity which runs alongside, and is in electrical contact with, the main track portion.

6. An array according to claim 5, wherein the resistance of said at least one electrode track varies along the length of the electrode track by virtue of the fact that the main track portion and/or the supplementary track portion of at least one section of the electrode track has a greater transverse width than the corresponding portion of at least one other section of the electrode track.

7. An array according to claim 5, wherein the resistance of said at least one electrode track varies along the length of the electrode track by virtue of the fact that the main track portion and/or the supplementary track portion of at least one section of the electrode track has a greater metallization thickness than the corresponding portion of at least one other section of the electrode track.

8. An array according to claim 1, wherein at least one of the sets of electrode tracks comprises a first subset of electrode tracks having end connection points at one edge of the array for connection to drive circuitry for applying respective switching waveforms to the electrode tracks of the first subset by way of said end connection points, and a second subset of electrode tracks interleaved with the electrode tracks of the first subset and having end connection points at the opposite edge of the array for connection to drive circuitry for applying respective switching waveforms to the electrode tracks of the second subset by way of said end connection points.

9. A ferroelectric liquid crystal device incorporating an addressable matrix array, said array comprising an addressable matrix of switching elements, a first set of electrode tracks on one side of the matrix, and a second set of electrode tracks on the other side of the matrix, the first and second sets of electrode tracks crossing one another at the locations of the switching elements and the switching elements being switchable by the application of respective switching waveforms to the first and second sets of electrode tracks, and at least one of the electrode tracks having a resistance which varies along the length of the electrode track in order to provide increased temperature uniformity over the array due to power dissipation during switching by the switching waveforms applied to the electrode tracks, wherein the resistance in an intermediate section of said at least one electrode track is greater than the resistance in two end sections of the electrode track, the two end sections being located operatively among the switching elements.

* * * * *